United States Patent [19]
Burdon et al.

[11] 3,883,559
[45] May 13, 1975

[54] FLUORINATED DIOXAN DERIVATIVES

[75] Inventors: James Burdon; Paul Leslie Coe; Ian William Parsons; John Colin Tatlow, all of Birmingham, England

[73] Assignee: Imperial Chemical Industries Limited, London, England

[22] Filed: Oct. 10, 1972

[21] Appl. No.: 296,136

[30]    Foreign Application Priority Data
    June 9, 1972    United Kingdom............... 27007/72

[52] U.S. Cl.............................. 260/340.6; 424/278
[51] Int. Cl............................................. C07d 15/14
[58] Field of Search ................................. 260/340.6

[56]            References Cited
    FOREIGN PATENTS OR APPLICATIONS
    737,529    9/1955    United Kingdom.............. 260/340.6

OTHER PUBLICATIONS

Hasek et al. "J. Am. Chem. Soc.," Vol. 82 pp. 543–551 (1960).
Burdon and Parsons "Tetrahedron," Vol. 27, pp. 4533 to 4551 (Oct. 1971).
Burdon and Parsons, "Tetrahedreon," Vol. 27, pp. 4553–4569 (Oct. 1971).

*Primary Examiner*—John M. Ford
*Assistant Examiner*—Robert T. Bond
*Attorney, Agent, or Firm*—Cushman, Darby & Cushman

[57]            ABSTRACT

Hexafluoro- and heptafluoro-1,4-dioxan derivatives, anaesthetic compositions containing them and a method of using them to produce anaesthesia in warm-blooded animals. Representative of the compounds disclosed is (±)-2H/3H-hexafluoro-1,4-dioxan.

3 Claims, No Drawings

FLUORINATED DIOXAN DERIVATIVES

This invention relates to a new inhalant anaesthetic agent which is a fluorinated dioxan derivative.

We have now found that certain polyfluorinated dioxan derivatives possess anaesthetic properties and at the same time are substantially free from undesirable side-effects when administered to warm-blooded animals by inhalation.

According to the invention there is provided a hexafluoro- or heptafluoro-1,4-dioxan derivative of the formula:

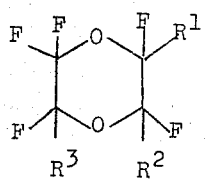

wherein one or two of $R^1$, $R^2$ and $R^3$ is or are hydrogen, two or one respectively of $R^1$, $R^2$ and $R^3$ being fluorine.

It is to be understood that when two of $R^1$, $R^2$ and $R^3$ are hydrogen, there are three possible position isomers of hexafluoro-1,4-dioxan, and that in each of these three isomers cis- and trans-isomerism of the two hydrogen atoms is possible. These various isomers will in this specification be named with respect to the two hydrogen atoms, for example 2H/3H-hexafluoro-1,4-dioxan indicating the compound wherein the two hydrogen atoms occupy the 2- and 3-positions of the 1,4-dioxan nucleus and are trans- one with respect to the other, and 2H,3H/-hexafluoro-1,4-dioxan indicating the corresponding compound wherein the two hydrogen atoms are cis- one with respect to the other. Two of the three trans-compounds, namely the 2H/3H-, and 2H/6H-hexafluoro-1,4-dioxan derivatives, and one of the cis-compounds, namely the 2H;5H/- hexafluoro-1,4-dioxan derivative, may exist in two optically-active forms, the dextro-rotatory (+)- and laevo-rotatory (−)-form, as well as in the racemic (±) form, and heptafluoro-1,4-dioxan may also exist in (+)-, (−)- and (±)-forms. The one remaining trans-compound, namely the 2H/5H-hexafluoro-1,4-dioxan derivative, and the two remaining cis- compounds, namely the 2H,3H/- and 2H,6H/- hexafluoro-1,4-dioxan derivatives, are optically-inactive compounds of the meso-type. It is to be understood that the definition of the 1,4-dioxan derivative of the invention encompasses all of the above-mentioned stereoisomers, and mixtures thereof.

Preferred dioxan derivatives of the invention are (±)-2H/3H-hexafluoro-1,4-dioxan (b.p. 72.5°C.) and (±)-heptafluoro-1,4-dioxan (b.p. 39°C.), and of these a particularly preferred derivative is (±)-2H/3H-hexafluoro-1,4-dioxan.

The dioxan derivatives of the invention may be obtained, as described by two of the inventors in respect of this invention in "Tetrahedron", 1971, 27, 4533 to 4569, by the fluorination of 1,4-dioxan over cobalt trifluoride at a temperature of 100°C.

The preferred dioxan derivative of the invention, (±)-2H/3H-hexafluoro-1,4-dioxan, has a high margin of safety. In mice, the $AC_{50}$ (that is, the concentration, volume by volume of the compound in total vapour, needed to produce full anaesthesia in 50% of the test mice within 30 minutes) is 0.7%. The $LC_{50}$ (that is, the concentration, volume by volume of the compound in total vapour, needed to kill 50% of the test mice within 30 minutes) is 3.1%. The margin of safety may be indicated by the therapeutic ratio, namely $LC_{50}/AC_{50}$, and this is therefore 4.4. For comparison, under similar test conditions ether has a therapeutic ratio of 2.88 and chloroform a therapeutic ratio of 2.66.

The other hexafluoro-1,4-dioxan derivatives of the invention have similar anaesthetic and lethal effects in mice to those of the preferred dioxan derivative, as hereinafter shown in Example 3. (±)-Heptafluoro-1,4-dioxan, on the other hand, shows a different spectrum of activity. The minimum concentration of compound, as hereinafter calculated in Example 2, needed to produce anaesthesia in mice is approximately 9.0%. A similarly-calculated concentration of compound of 18.8% does not kill mice. This compound is therefore a very safe, mild anaesthetic agent.

According to a further feature of the invention there is provided an anaesthetic composition which comprises at least one hexafluoro- or heptafluoro-1,4-dioxan derivative of the formula:

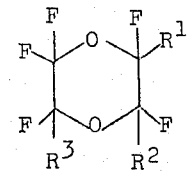

wherein one or two of $R^1$, $R^2$ and $R^3$ is or are hydrogen, two or one respectively of $R^1$, $R^2$ and $R^3$ being fluorine, together with oxygen and optionally together with one or more other physiologically-acceptable material(s), the proportion of dioxan derivative in the composition being such that when the composition is administered by inhalation to a warm-blooded animal anaesthesia is produced and/or maintained, and the proportion of oxygen in the composition being such that when the composition is administered by inhalation to a warm-blooded animal respiration is maintained.

It is to be understood that the dioxan derivative must be free of toxic impurities when it is used in the composition of the invention.

The oxygen present in the composition of the invention may be pure oxygen, or it may be in the form of air, that is in admixture with nitrogen and smaller quantities of other gases.

The other physiologically-acceptable material(s) that may optionally be present in the composition of the invention may be, for example, one or more substances selected from other inhalant anaesthetics, for example halothane, nitrous oxide, ether, cyclopropane, trichloroethylene, enflurane, fluoroxene, teflurane and 2-chloro-1,1,1-trifluoroethyl difluoromethyl ether; pharmaceutically-inert gases, for example nitrogen, chemically inert gases such as are present in air, for example neon and argon, and carbon dioxide and water vapour; and pharmaceutically-acceptable stabilisers which may be present to protect one or more of the other components of the composition from the effect of light, oxidation and/or attack by acid or base.

The composition of the invention will usually contain between 0.5% and 12% volume by volume of the dioxan derivative, and a preferred composition of the invention will contain between 4% and 6% volume by volume of (±)-2H/3H-hexafluoro-1,4-dioxan when used for induction of anaesthesia, and between 1% and 2% volume by volume of (±)-2H/3H-hexafluoro-1,4-dioxan when used for maintenance of anaesthesia. Compositions containing the other hexafluoro-1,4-dioxan derivatives of the invention will contain similar proportions of the anaesthetic agent to those containing the preferred dioxan derivative of the invention. Compositions containing (±)-heptafluoro-1,4-dioxan will contain a substantially higher proportion of anaesthetic agent, usually between 9% and 12% volume by volume.

The composition of the invention may be administered to warm-blooded animals, including man, for the production of anaesthesia by conventional techniques. The composition may be preformed and administered as such, or alternatively the dioxan derivataive and oxygen, either of which may have other physiologically-acceptable materials present with it, may be administered separately, the composition of the invention being formed either immediately prior to, or during, the course of administration.

According to a further feature of the invention there is provided a method for producing anaesthesia in a warm-blooded animal which comprises administering to said animal an anaesthetically-effective amount of at least one hexafluoro- or heptafluoro-1,4-dioxan derivative as defined above, together with sufficient oxygen to maintain respiration.

The invention is illustrated but not limited by the following Examples:

EXAMPLE 1

A cat was lightly anaesthetised with nitrous oxide, oxygen and halothane so that the trachea could be intubated with a cuffed endotracheal tube. A carotid artery was cannulated and connected to a transducer to record blood pressure. A jugular vein was cannulated to record venous pressure in a similar manner.

Blood pressure, central venous pressure, respiratory rate, tidal volume and electrocardiogram were recorded continuously.

The cat was allowed to recover from the halothane anaesthesia to the stage where spontaneous limb movements were just present. A mixture consisting of 4.21% by volume of the anaesthetic agent (±)-2H/3H-hexafluoro-1,4-dioxan and 95.79% by volume of oxygen was prepared in a Douglas bag. The mixture was administered by inhalation via a non-rebreathing system. After 2 minutes of inhalation the cat was fully anaesthetised with loss of palpebral, corneal and limb flexor reflexes. The concentration of the anaesthetic agent in the inhaled mixture was reduced to 1.04% by volume in oxygen after 10 minutes and anaesthesia was maintained for a further 30 minutes. A mild hypotension was recorded but no cardiac irregularities or adverse effects on respiration were observed.

Increasing the concentration of the anaesthetic agent to 6.19% by volume in the inspired gas produced anaesthesia in 1 minute. Deep anaesthesia of 35 minutes duration using this concentration produced depression of respiration but no cardiac irregulaties.

Concentrations of 1.55% and 1.97% produced satisfactory surgical anaesthesia with rapid recovery on withdrawal of the anaesthetic agent.

EXAMPLE 2

An anaesthetic mixture is prepared in a conical flask (volume 550 ml.) by flushing the flask with pure oxygen, adding a measured volume (up to 1 ml.) of (±)-2H/3H-hexafluoro-1,4-dioxan (molecular weight 196; specific gravity 1.74), stoppering the flask and shaking the flask until equilibration is complete. The stopper is then removed, allowing the anaesthetic mixture to attain atmospheric pressure, a single mouse is inserted into the flask and the stopper is rapidly replaced. The concentration by volume of hexafluorodioxan in the mixture is calculated by conventional means from the volume of hexafluorodioxan added to the flask. The mouse is observed for at least 30 minutes and its behaviour is recorded. The experiment is repeated using different volumes of hexafluorodioxan (a separate mouse being used for each experiment). The minimum anaesthetic concentration, that is, the minimum concentration at which, when the flask is tilted, a mouse is unable to right itself after exposure for almost 30 minutes, is found to be between 0.6 and 0.8%. The minimum lethal concentration, that is, the minimum concentration which kills a mouse after almost 30 minutes exposure, is found to be between 2.7 and 3.6%.

EXAMPLE 3

The process described in Example 2 is repeated except that the (±)-2H/3H-hexafluoro-1,4-dioxan is replaced by other hepta- or hexa-fluoro-1,4-dioxan derivatives. The ranges of minimum anaesthetic concentrations (m.a.c.) and minimum lethal concentrations (m.l.c.) found for mice are as follows:

| 1,4-dioxan derivative | m.a.c. (%) | m.l.c. (%) |
| --- | --- | --- |
| (±)-heptafluoro | approximately 9.0 | >18.8 |
| 2H/5H- | 0.7 – 0.8 | 2.6 – 2.8 |
| (±)-2H,5H/- | 0.7 – 1.0 | 3.2 – 3.6 |
| (±)-2H/6H- | 1.4 – 1.9 | 3.0 – 3.3 |
| 2H,6H/- | 1.2 – 1.4 | >4.7 |

EXAMPLE 4

A group of 10 mice is placed in a chamber of 10 litres capacity and a mixture of (±)-2H/3H-hexafluoro-1,4-dioxan and oxygen of known and fixed percentage is passed through the chamber for 30 minutes. The experiment is repeated with various groups of mice, each group being exposed to a different mixture of hexafluorodioxan and oxygen. The $AC_{50}$, that is the concentration by volume of hexafluorodioxan which anaesthetises 5 mice out of 10 after 30 minutes exposure, is found to be 0.7%. The $LC_{50}$, that is the concentration by volume of hexafluorodioxan which kills 5 mice out of 10 after 30 minutes exposure, is found to be 3.1%. The therapeutic ratio of this compound is therefore 3.1/0.7, that is 4.4. Under similar conditions the $AC_{50}$, $LC_{50}$ and therapeutic ratio for halothane are respectively 0.85%, 3.4% and 4.0. During this experiment it is found that a concentration of 1.55% of (±)-2H/3H-hexafluoro-1,4-dioxan in oxygen produces an equivalent depth of anaesthesia to that produced by a concentration of 2.0% of halothane in oxygen.

EXAMPLE 5

A cat was anaesthetised with thiopentone, ventilated to maintain a normal partial pressure of carbon dioxide in the blood, and anaesthesia was then maintained with a mixture of 1.04% by volume of (±)-2H/3H-hexafluoro-1,4-dioxan in oxygen prepared as described in Example 1. A solution containing 20 μg./ml. of adrenaline in physiological saline was then infused at a constant rate. No cardiac dysrythmias were noted after two separate challenges of adrenaline totalling 16.8 μg. and 22.4 μg. respectively. Maintenance of anaesthesia was then changed to halothane, and the adrenaline challenge repeated. Mild cardiac dysrythmias were noted after a total of 5.6 μg. of adrenaline had been administered.

EXAMPLE 6

A cat was anaesthetised with a mixture of 3.2% by volume of (±)-2H/3H-hexafluoro-1,4-dioxan and 96.8% by volume of oxygen prepared in a Douglas bag. After 15 minutes the concentration of hexafluorodioxan was reduced to 1.5%, and a sufficient plane of anaesthesia was thereby maintained to permit the necessary surgery for introduction of arterial and venous cannulae. The systolic blood pressure of the cat was steady in the range 75–80 mm.Hg. (a similar degree of mild hypotension to that produced by halothane), and the partial pressure of carbon dioxide in the blood was within the range 38.7–52 mm. Hg, thus showing no significant depression of respiration. After a further 1 hour the concentration of hexafluorodioxan was reduced to 1.04%, and a surgical plane of anaesthesia was maintained for yet a further 1 hour. The anaesthetic agent was then removed. The cat began to stretch and move after 3 minutes, sat up after 14 minutes, was able to walk ataxically after 18 minutes and after 30 minutes was fully recovered.

What we claim is:

1. A hexafluoro- or heptafluoro-1,4-dioxan derivative of the formula:

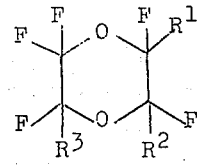

wherein one or two of $R^1$, $R^2$ and $R^3$ is or are hydrogen, two or one respectively of $R^1$, $R^2$ and $R^3$ being fluorine.

2. The compound (±)-2H/3H-hexafluoro-1,4-dioxan.
3. The compound (±)-heptafluoro-1,4-dioxan.

* * * * *